Feb. 9, 1960 L. H. HODGES 2,924,188
AGRICULTURAL PRESS DRILL
Filed July 27, 1954 5 Sheets-Sheet 1
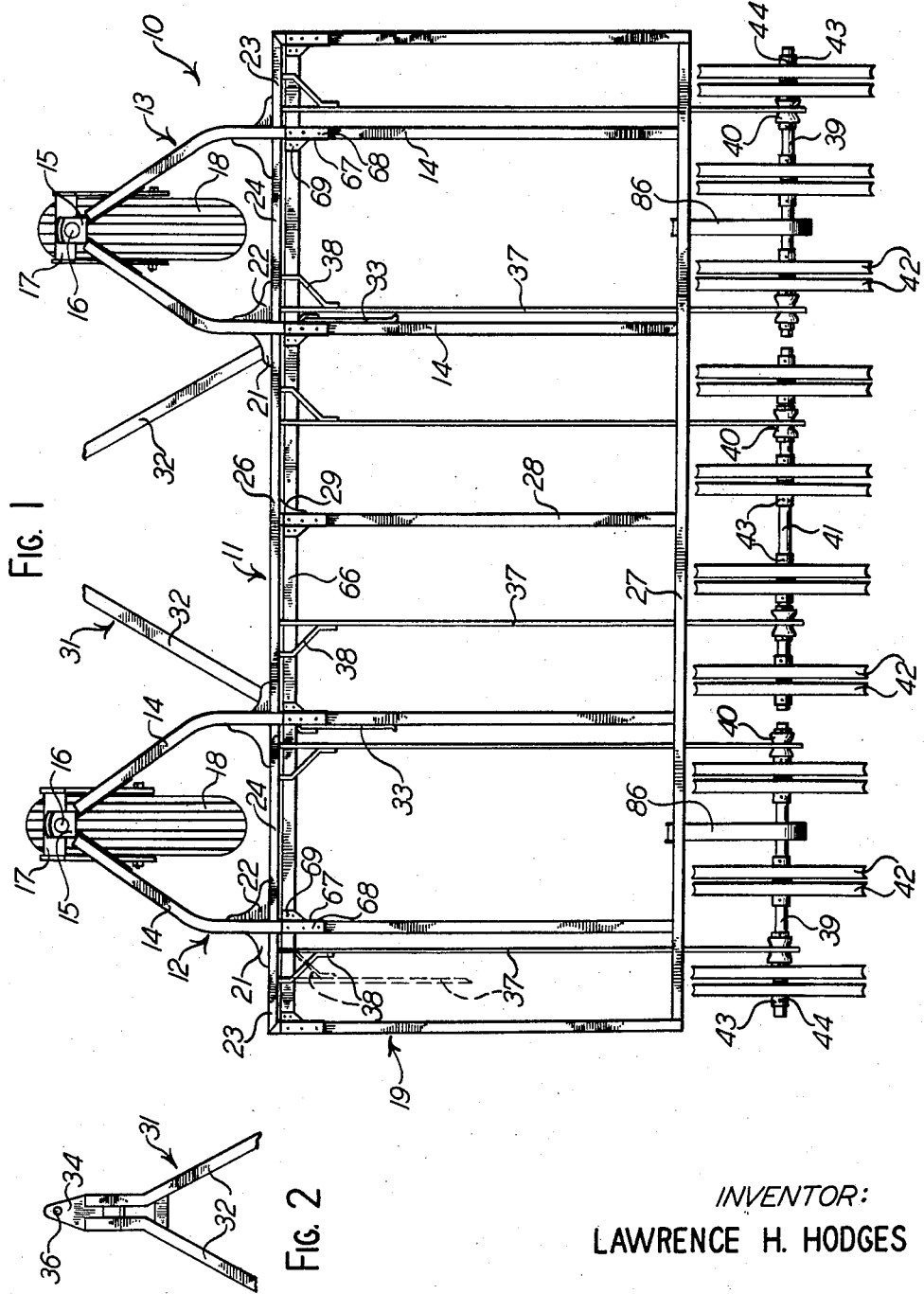
INVENTOR:
LAWRENCE H. HODGES
BY: Emerson B Donnell
ATTORNEY Feb. 9, 1960　　　　　L. H. HODGES　　　　　2,924,188
AGRICULTURAL PRESS DRILL Filed July 27, 1954　　　　　　　　　　　　　5 Sheets-Sheet 2

INVENTOR:
LAWRENCE H. HODGES

BY: *Emerson B. Donnell*
ATTORNEY

Feb. 9, 1960 L. H. HODGES 2,924,188
AGRICULTURAL PRESS DRILL
Filed July 27, 1954 5 Sheets-Sheet 3

INVENTOR:
LAWRENCE H. HODGES

BY: Emerson B Donnell
ATTORNEY

Feb. 9, 1960 L. H. HODGES 2,924,188
AGRICULTURAL PRESS DRILL
Filed July 27, 1954 5 Sheets-Sheet 4

INVENTOR:
LAWRENCE H. HODGES

BY: Emerson B. Donnell
ATTORNEY

Feb. 9, 1960     L. H. HODGES     2,924,188
AGRICULTURAL PRESS DRILL

Filed July 27, 1954     5 Sheets-Sheet 5

INVENTOR:
LAWRENCE H. HODGES

BY: Emerson B Donnell
ATTORNEY of the usual channel irons. The preferred manner of assembling the frames is by bolting angle brackets 21 and 22 onto both sides of the caster frames and to the front of the main frame 19. For this construction, the front of the main frame is composed of end sections 23, caster frame sections 24, and an intermediate section 26. The ends of these sections are thus secured to the caster frames by the brackets 21 and 22 in any well-known manner. The rear edge of the frame 19 is defined by a continuous length of channel 27 which is bolted to the rear ends of the frames. Channels 14, of both the frames 12 and 13, are thus attached to the channel 27 in a conventional manner. A center frame channel 28 is preferably extended across the frame 19 and is bolted to the frame section 26 by a bracket 29 and also to the rear of the frame in any well-known manner.

United States Patent Office 2,924,188
Patented Feb. 9, 1960

2,924,188

AGRICULTURAL PRESS DRILL

Lawrence H. Hodges, Rockford, Ill., assignor to J. I. Case Company, Racine, Wis., a corporation of Wisconsin Application July 27, 1954, Serial No. 446,024

3 Claims. (Cl. 111—62)

This invention relates to an agricultural planter, and, more specifically, it relates to a grain press drill.

An object of this invention is to provide a press drill frame structure which is durable but yet desirably flexible and in one horizontal plane.

A further object is to provide an improvement in the mounting of the seeder drive chain guard on the main frame of the drill.

Other objects and advantages will become apparent upon reading the following description in conjunction with the accompanying drawings, wherein, Fig. 1 is a top plan view of a grain drill of this invention with parts removed.

Fig. 2 is a top plan view of the front end of the frame structure of the embodiment shown in Fig. 1.

Similar reference numerals refer to the same parts throughout the several views and the specification.

Figure 6:
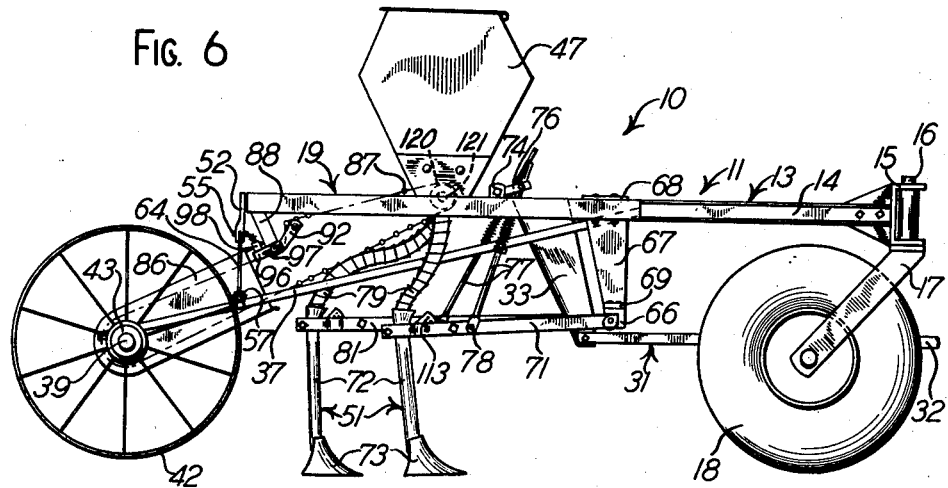
Fig. 6 is a side elevational view of the lister shovel type of drill shown in part in Fig. 1.
Figure 7:
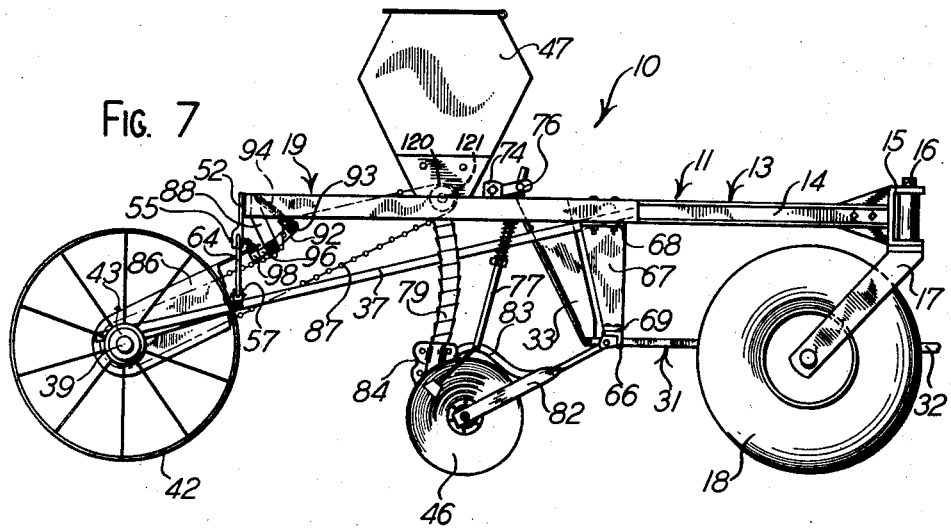
Fig. 7 is a side elevational view of the disk type of drill shown in part in Fig. 3 with certain parts broken away and sectioned.

Referring to Fig. 1, a grain press drill 10 is shown in a top view with parts removed to facilitate a description of a frame structure 11 of the drill. The frame 11 consists of a left hand caster wheel frame 12 and a right hand caster wheel frame 13. The frames 12 and 13 are each composed of a pair of channel irons 14 which are disposed in the normal direction of movement of the drill 10. The forward ends of the channels 14 of both the frames 12 and 13 terminate in diagonally converging ends which contain the usual caster wheel bearings 15. A vertical wheel spindle 16 is received in each of the bearings 15 to support a caster wheel yoke 17 at the lower end thereof. The usual wheel 18 is received within the yoke 17 to provide ground support for the drill. Constructed around and integral with the frames 12 and 13 is a main frame 19 which is rectangular but disposed in a direction transverse to the direction of drill travel and extended across both of the other frames. It should be understood that the frames 12, 13 and 19 are all horizontally disposed and composed To enable the drill 10 to be attached to a tractor, a hitch 31, comprising a pair of forwardly converging channels 32, is provided, the rear ends of the channels being suitably attached to hitch plates 33 bolted to the caster frames 12 and 13 to depend vertically therefrom. The channels 32 are shown in Fig. 2 at their forward ends where they are fixed to a hitch plate 34 which is provided with a vertical hole 36 for receiving a tractor hitch pin. Figs. 6 and 7 show a side view of the drawbar connection which is conventional and need not be further described.

Figure 3:
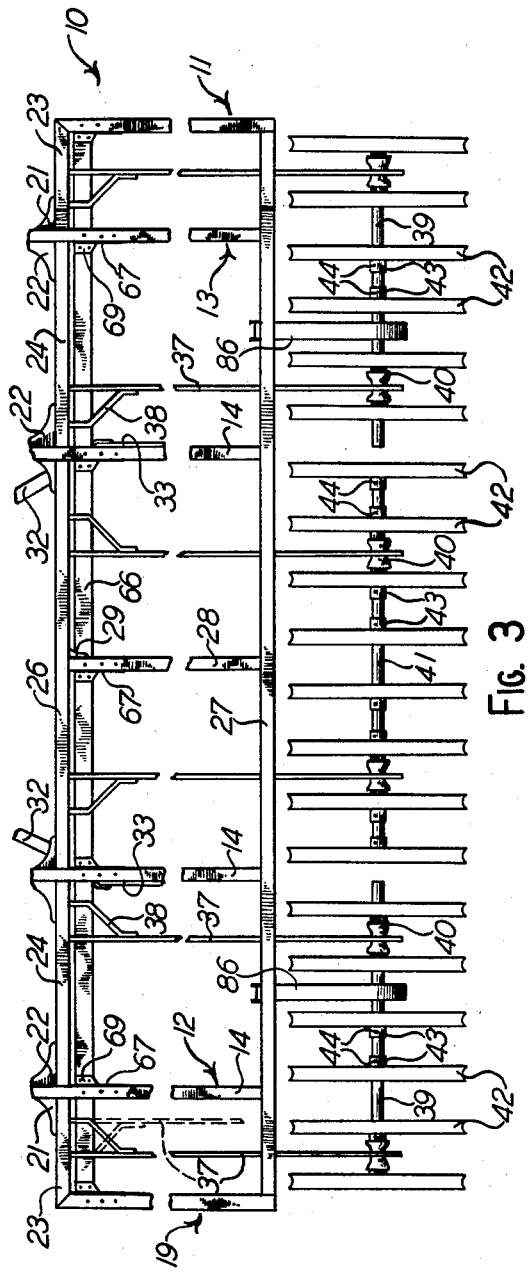
Fig. 3 is a fragmentary top plan view of the grain drill shown in Fig. 1 but with parts thereof in a different position.

Figs. 1, 3 and 6 also show a plurality of drag bars 37 connected by brackets 38 to the front edge of the main frame 19 to be spaced therealong and to extend longitudinally of the direction of travel of the drill 10. Fig. 6 shows that the bars 37 are inclined downwardly to the rear of the drill 10. The rear ends of the bars 37 attach to the ends of horizontally disposed axles 39 and 41 through any conventional type of bearings 40. Thus, two end axles 39 are shown aligned with each other at the rear of the frame 19 while the axle 41 is aligned between the end axles with each axle having a bar 37 attached to each of its outer ends to permit the axle to rotate. A plurality of press wheels 42 are non-rotatably mounted in gangs on the axles to provide three gangs of press wheels.

The wheels 42 are each provided with a hub 43 which is attached to the wheel to extend axially thereof on one side only. A set screw 44 passes through each hub in the usual manner to non-rotatably secure each wheel to the axle.

An important feature of this invention is to be able to convert the press drill from a lister shovel type to a disk type or vice versa. In so converting, it is necessary to change the spacing of the press wheels to where they follow directly behind either the lister shovel ground opener as may be required or the disk ground opener. Thus, Fig. 1 shows the wheels 42 spaced in pairs to accommodate the lister shovel openers. In actual practice, the standard spacing of the wheel pairs is fourteen inches for the lister shovels. Fig. 3 then shows the position of the wheels 42 when the drill is arranged with disk openers. Here the wheels are spaced uniformly and in actual practice the standard requires seven inch spacing. It should also be noticed that the drag bars 37 are turned over as indicated by the dotted lines in Fig. 1. Thus, to properly accommodate the required shift in the bearings 40, two of the drag bars 37 on each end of the frame are turned over to be offset as shown between Figs. 1 and 3. The foregoing described rearrangement is accomplished by releasing the set screws 44 and removing the wheels from the axles 39 and 41. The wheels 42 are then replaced on the axles in the desired shown position.

Figure 4:
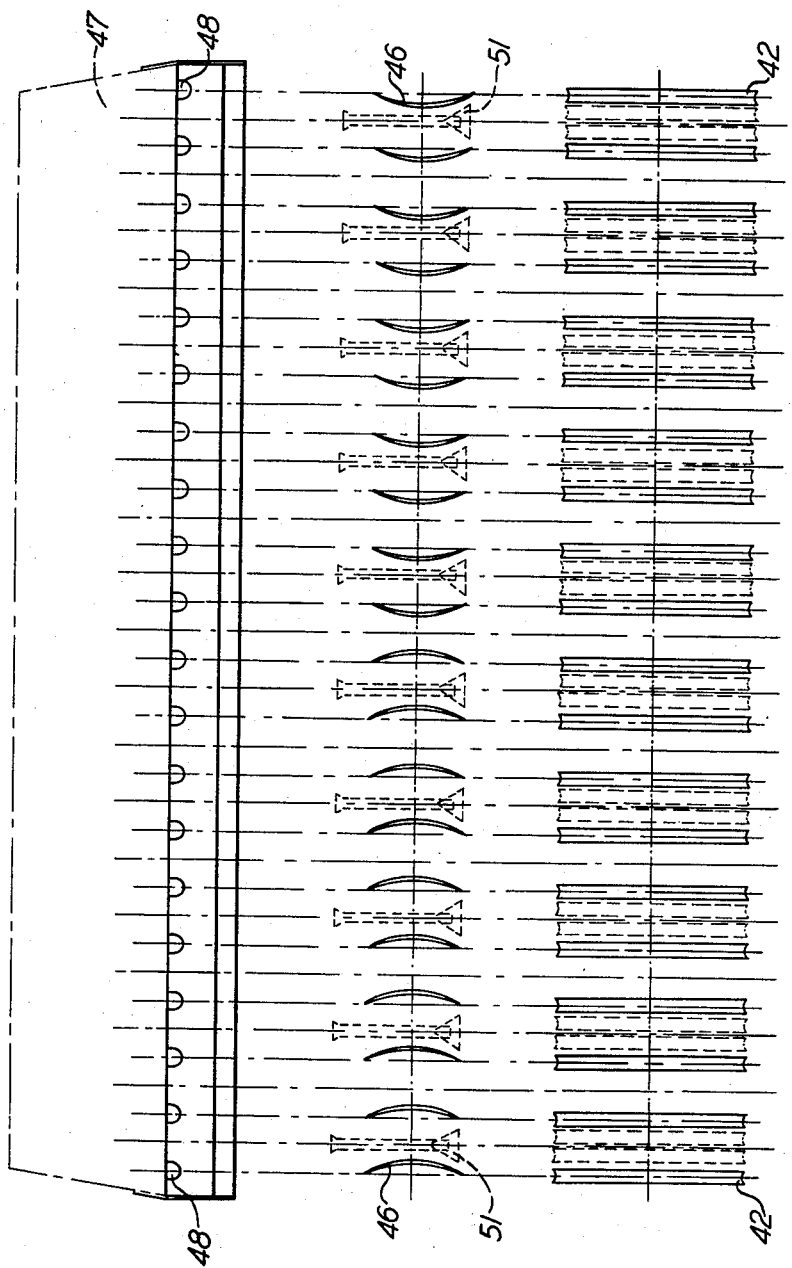
Fig. 4 is a top plan composite diagrammatic view similar to the views of Figs. 1 and 3 but showing the interchangeability between the lister shovel type and the disk type of grain drills.

Fig. 4 shows, in a diagrammatic composite view of Figs. 1 and 3, the two arrangements of the drill. In this view, the wheels 42 are shown in solid lines which represent the wheel positions for the disk type opener. Also, a plurality of disks 46 is illustrated, and they are represented in their normal positions on the drill. Further, a seed hopper 47 is shown in dot-dash lines with the usual seed cups 48 attached to the bottom side thereof. It should, therefore, be understood that all of the elements of the drill are properly aligned, with, a course, the outlet of the seed cups being behind the disks 46 as will appear later. Also, Fig. 4 shows the position of the wheels 42, in dotted lines, aligned behind the lister openers 51, also shown in dotted lines. In this arrangement, seed from alternate seed cups 48 is directed to the lister openers 51 through seed tubes which are shown and described elsewhere.

Figure 5:
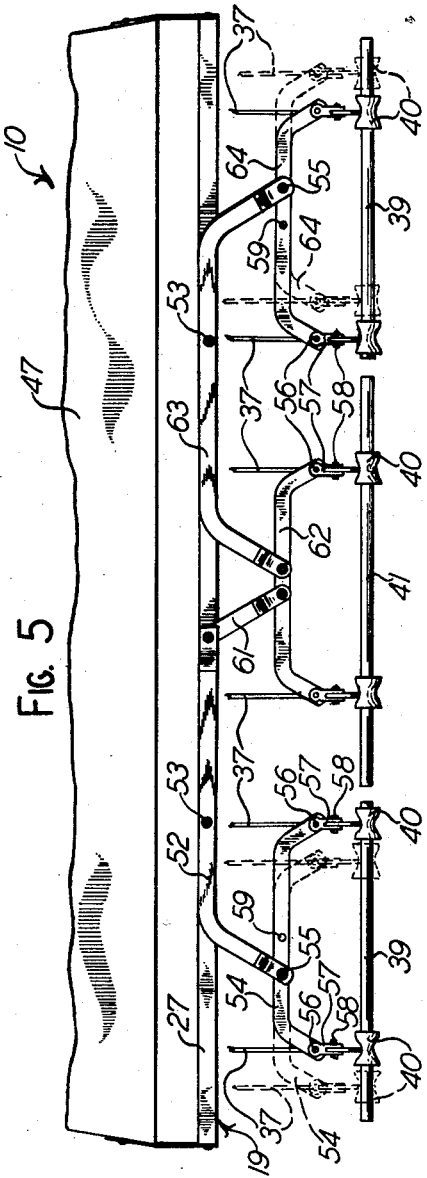
Fig. 5 is a rear elevational view of a part of a grain drill of this invention.

Fig. 5 shows the rear of a part of the drill 10, and particularly the mounting for the axles 39 and 41. Attached to the rear of the frame channel 27 and off to the left side thereof is a first main equalizer bar 52 which can pivot vertically about its attaching support 53. The outside end of the bar 52 pivotally supports an outer lower equalizer bar 54 on a pin 55. The bar 54 has a pair of depending ends each of which attaches by a pivot bolt 56 to a drag bar pivot support 57 which in turn attaches to its respective drag bar 37 by a bolt 58. An important feature is the provision of two holes in the bar 54, like the hole 59, for the purpose of offsetting the bar when the pin 55 is removed and the bar 54 is offset to the dotted line position. In this manner, the bar 54 is shifted with the drag bars 37 and the bearings 40 when they are realigned in changing from lister bottom to disk openers, for example.

The opposite end of the bar 52 is preferably bifurcated to pivotally receive a toggle link 61 which partly pivotally supports a center lower equalizer bar 62. Also, a second main equalizer bar 63 is pivotally attached to the channel 27 at 53 to pivotally support the bar 62 at one end and to support a second lower outside equalizer bar 64 at the opposite end. These members and connections are similar to those previously described.

With the foregoing described construction, it should be understood that the rear end of the press drill is supported on the press wheels 42. The latter rotate in the operation of the drill, and, since they follow directly behind the rows of seed and the openers, they press soil over the seed as desired. Also, during operation over uneven terrain, the equalizers described permit the usual flexiblity or up-and-down movement of the press wheels to insure firm and uniform soil packing.

Referring again to Fig. 1, it will be seen that a drawbar 66 is attached by plates 67 to be horizontally positioned approximately directly underneath the front of the frame 19. The plates 67 are suitably bolted to the longitudinally extending pieces of the farme 11, and they depend therefrom to be bolted to the bar 66. Also, see Fig. 6. At this time attention is directed to the fact that Figs. 1 and 6 show the plate 67 with its upper angled end 68 resting on top of the channels of the frame 11. However, Figs. 3 and 7 show the plate 67 attached underneath the channels of the frame to place the drawbar 66 at a lower level. The lower end of the plate 67 contains an angled section 69 which is bolted to the bar 66. With this arrangement, the drawbar is adjustable in its horizontal level as desired for the different openers described hereinafter.

Figs. 6 and 7 respectively show the press drill 10 with the lister openers 51 and the disk openers 46. The lister openers are preferably attached underneath the frame 19 in the two rows shown to stagger the openers. A short drag bar 71 is pivotally attached to the drawbar 66 to extend rearwardly therefrom and longitudinally of the direction of press drill movement. Suitably attached to the rear bifurcated end of the drag bar 71, in a manner described later, is a substantially vertical tubular shank 72. The bottom end of the shank 72 has a lister shovel 73 attached thereto. To further support the opener 51, a bracket 74 is mounted on the top outside channel of the frame 19 to support the usual bar (not shown) transversely across the top of the frame. A plurality of the usual lift arms 76 attached to the bar extend upwardly at the front thereof and connect to the usual pressure rods 77. The latter attach to the drag bars 71 by bolts or pins 78 and are spring loaded, all in the conventional manner. Flexible tubes 79 communicate between the seed cups 48 of the seed hopper 47 and the tubes 72.

The second row of openers 51 is constructed the same as the one described except, of course, that drag bars 81 are longer than the drag bars 71.

Fig. 7 shows the press drill 10 with the disk openers 46. In this construction, the disks are mounted in one row, as indicated, and are attached to the draw bar 66 by drag bars 82. The rear ends of the latter rotatably receive the disks 46 which form the usual ground furrows for seeding. The usual pressure rods 77 attach to arch bars 83 mounted on the drag bars 82 and connected to support the usual seed tubes 84. Again the flexible tubes 79 communiate between the seed cups 48 and the tubes 84.

As previously mentioned, the manner of attaching the plates 67 to the frame 19 determines the height of the drawbar 66. It should now be apparent that the important angle of draft of the openers 46 and 51, through the drag bars 71, 81, and 82, can be adjusted as desired by the positioning of the plates 67. This is accomplished with the same structure throughout except, of course, for converting the openers and their allied parts.

Figs. 6 and 7, with Figs. 1 and 3, further show a drive chain cover 86 suitably attached between the frame 19 and the axle 39. A chain 87 is engaged, in the usual maner, with the sprocket 120 on shaft 121 in the base of the hopper 47 to extend down to operatively connect, in any well-known manner, to the axle 39. Thus, the seed cups 48 are operated in response to the rotation of the press wheels 52 and the axles 39.

The manner of attaching the guards or covers 86 to the axles 39 is conventional. However, the manner of attaching the guards to the frame 19 is deemed to be novel. This mounting is the same for either type of opener, but Fig. 7 shows part of the mounting in section and part of the guard broken away.

As shown in the four figures referred to, a chain tightener is mounted on the channel 27 of the frame 19 by a chain guard support consisting of a pair of arms 88 which are rigidly attached to the channel in any suitable manner to extend forwardly and downwardly therefrom in the plane of each chain guard 86. The arms 88 are spaced apart and contain the usual spool 89 at the lower end with a pin 91 securing the spool to the arms. A pair of the usual pivotal links 92 is also held by the pin 91 to extend upwardly therefrom in the plane of the chain which passes over the top of a spool 93 attached between the extended ends of the links 92. A spring 94 is attached between the extended ends of the links and the channel 27 to create a tension on the chain 87 in the well-known manner.

Figure 8:
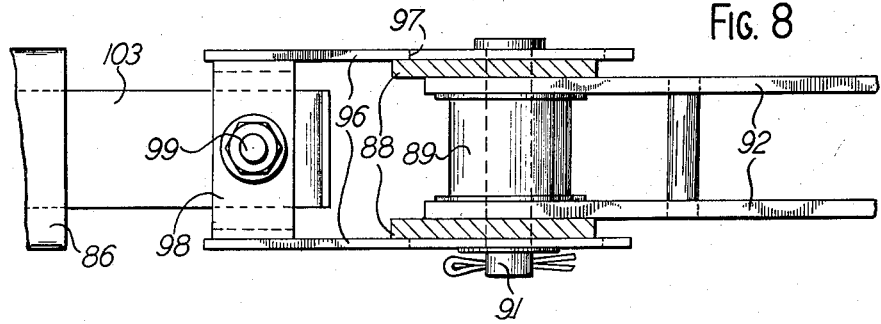
Fig. 8 is an enlarged fragmentary top plan view of parts shown in Fig. 6.
Figure 9:
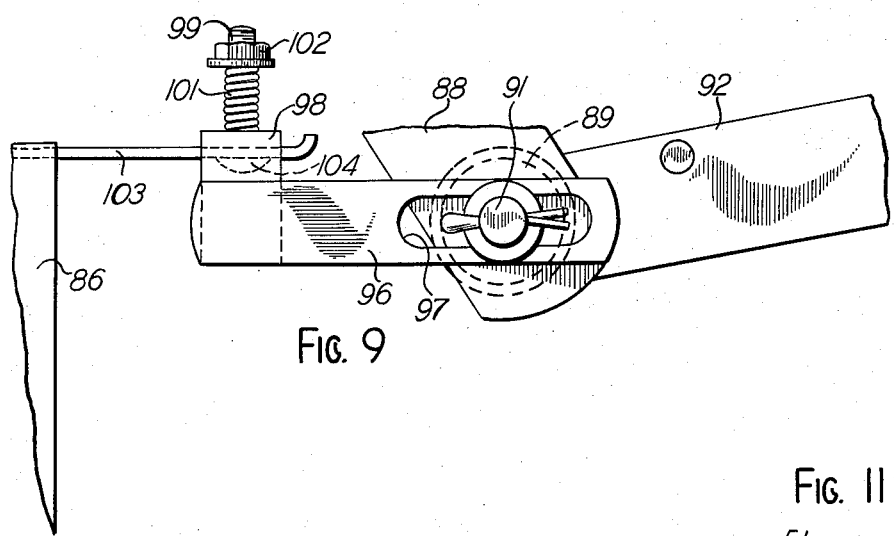
Fig. 9 is a side elevational view of the parts shown in Fig. 8.

Figs. 8 and 9, particularly, show another pair of links 96 engaged through their slots 97 with the ends of the pin 91. The latter loosely retains the links 96 to permit them to slide with the pin in the slots 97 which are disposed to substantially align with the top of the guard 86 as shown in Fig. 6. The rear ends of the links 96 are connected by a mounting bracket 98 which receives a bolt 99. It is preferred that a coil spring 101 be positioned between a nut 102, threaded onto the upper end of the bolt 99, and the top of the bracket 98. Obviously, the links 96 are spring loaded to align with a connector 103 extending out from the chain guard 86 to be clamped to the bracket by the bolt head 104 shown in dotted lines. The links 96, bracket 98, and connector 103 form a chain guard extension.

With this arrangement, vertical movement of the axles 39 will cause the chain tightener to adjust the chain 87 to accommodate this movement. Also, since the axles would thus be pivoting about the forwardly located connection of the drag bars 37 to the frame 19, the rear end of the chain guard 86 would move a distance equal to that of the axles, but the front end of the guard pivoting also about pin 91, acquires a component of longitudinal movement which requires an adjustable connection such as the one provided by the slotted links 96. The spring 101 provides for yielding of guard 86 in any direction required by movements of axle 39.

Figure 11:
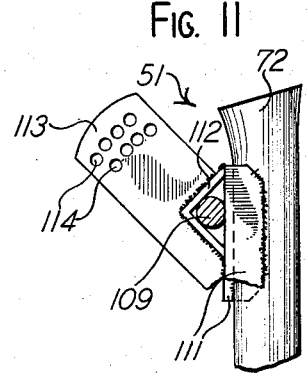
Fig. 11 is a side elevational view of the structure shown in Fig. 10 with parts removed.
Figure 10:
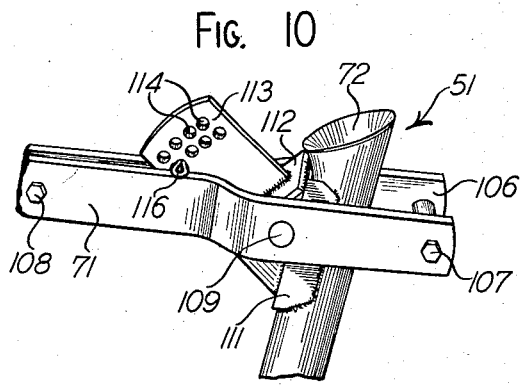
Fig. 10 is an enlarged fragmentary side perspective view of the lister shown in Fig. 6 but showing the side opposite thereto.

Attention is now directed to Figs. 10 and 11 which show the opposite side of the upper end of the lister opener 51 and its mounting. Here it is noticed that the drag bar 71 is composed of a pair of bars forming a bifurcated rear end 106 which is secured by a bolt 107 while a bolt 108 secures the forward end of the bar as shown. Intermediate the bolts 107 and 108 is a transverse pin 109 suitably affixed to extend horizontally across the bar 71. The tubular shank 72 is transverse to the bar 71 and attaches thereto to pivotally depend therefrom on the pin 109. The upper end of the shank 72 receives the flexible tube 79 which deposits seed into the shank for placing in the ground behind the shovel 73 in the usual manner.

The top and forward side of the shank 72 has a pair of angle irons 111 welded thereto in a vertical position with their inner edges abutting to form a channel in the top view. A third angle iron 112 is welded across the irons 111 to be horizontal and provide a space for receiving the pin 109 as shown in Fig. 11. To complete the mounting construction, a plate 113 is welded to the angle 112 to extend vertically and forwardly of the shank 72 between the sides of the drag bar 71. The plate 113 contains a plurality of holes 114 which are on the forward end thereof. One of the holes 114 receives a shear pin 116 and the latter then abuts the top edges of the sides of the bar 71 to provide a limit on the rearward movement of the shovel 73. Of course, an excessive rearward force on the shovel will cause the pin 116 to shear and allow the opener 51 to swing freely.

An important feature of this contruction is that the pin 116 can be placed in any one of the holes 114 and thereby vary the angle of the shank 72 with respect to the drag bar 71. In this manner, the shovels 73 can be angularly adjusted with respect to the ground.

While a specific embodiment of this invention has been shown and described, it should be obvious that certain changes can be made within the scope of this invention which should, therefore, be limited only by the appended claims.

I claim:

1. In a press drill of the type including a main frame carrying a plurality of furrow openers attached in depending relation to said frame, dispenser mechanism including a rotatable shaft operatively mounted on said main frame, an axle disposed rearwardly of said main frame, means connecting said axle to said main frame for up-and-down movement in supporting relation thereto and substantially horizontally disposed, ground engaging press wheels spaced along said axle to support it and said frame, at least one of said wheels being fixed on said axle, said axle carrying a sprocket fixed thereon, and a chain engaged with said sprocket and rotatable shaft, and chain tightener means secured to said frame; the combination of a chain guard substantially enclosing said sprocket and chain and journaled at one end on said axle, a chain guard support attached to said main frame, and said chain guard having an extension projecting lengthwise thereof toward said main frame, a pin secured transversely of said support, and engaged with said extension, and said extension having a slot engaged with said pin for supporting said chain guard from said main frame while providing for lengthwise movement of said chain guard relatively to said main frame induced by such up-and-down movement of said axle.

2. In a press drill, the combination comprising a main frame, a plurality of furrow openers attached to depend from said frame, an equalizer bar attached to said frame, a plurality of drag bars connected to said frame and said equalizer bar and extending rearward of said frame, an axle rotatably attached to the rear ends of said drag bars and horizontally disposed, press wheels at the rear of said frame and spaced along said axle for supporting said frame, a dispenser mechanism having a rotatable shaft, a drive chain engaged between the shaft and said axle and operated by said axle, chain tightener means secured to said frame, a chain guard disposed longitudinal to said press drill movement and mounted at the rear end on said axle, a chain guard support arm attached to said frame, a link connected to the forward end of said guard and having a slotted opening for connecting with said support arm, pin means disposed in said slot for interconnecting the link and support arm to effect a lost motion therebetween, and a spring operative between said guard and said link for yieldingly binding the latter two together under the influence of said spring.

3. In a press drill, the combination comprising a main frame horizontally disposed, ground wheels attached to depend from the front of said frame to support the front end of said frame, an equalizer bar pivotally attached to the rear of said frame, drag bars attached to said frame and said equalizer bar, an axle rotatably mounted on said drag bars and horizontally disposed behind said frame and moveable with said equalizer bar, a plurality of press wheels non-rotatably mounted along said axle to support the rear end of said frame on the ground, a dispenser mechanism having a rotatable shaft, a drive chain operatively engaged between the shaft and said axle and extending forward thereof, chain tightener means attached to said frame for supporting said chain on said frame and including a pin disposed parallel to said axle, said chain guard surrounding said chain and mounted on said axle at the rear end thereof and attached to said pin of said chain tightener means at the forward end thereof, the attachment between said guard and said pin including a slot in said guard for sliding of the latter on said pin when said axle is moved with respect to said frame, said means also including a chain tightener link pivotally mounted on said pin with a spring attached to said link for urging it against the tension of said chain.

References Cited in the file of this patent

UNITED STATES PATENTS

| | | |
|---|---|---|
| 102,081 | Bickford | Apr. 19, 1870 |
| 276,203 | Warner | Apr. 24, 1883 |
| 332,717 | Kirkpatrick | Dec. 22, 1885 |
| 677,564 | Dodson et al. | July 2, 1901 |
| 778,999 | Pelton | Jan. 3, 1905 |
| 944,578 | Paul | Dec. 28, 1909 |
| 1,036,252 | Jones et al. | Apr. 20, 1912 |
| 1,897,421 | Dempster et al. | Feb. 14, 1933 |
| 2,008,742 | Benjamin | July 23, 1935 |
| 2,140,622 | Graham | Dec. 20, 1938 |
| 2,314,235 | Morris | Mar. 16, 1943 |
| 2,563,172 | Hyland et al. | Aug. 7, 1951 |
| 2,569,870 | Roberts | Oct. 2, 1951 |
| 2,701,513 | Hyland et al. | Feb. 8, 1955 |

OTHER REFERENCES

Publications: John Deere Operator's Manual OM–M13–1249, only pages 2, 3, 4, 41 and 42 required. Received in Scientific Library April 30, 1958. (Effective date as reference August 2, 1949.) John Deere Operator's Manual OM–M13–153, only pages 2, 3, 4, 12 and 44 required. Received in Scientific Library September 1, 1955. (Effective date as publication March 6, 1953.)